United States Patent [19]

Carlston

[11] Patent Number: 5,024,403
[45] Date of Patent: Jun. 18, 1991

[54] PIPE HANGER

[75] Inventor: Jerry B. Carlston, Salt Lake City, Utah

[73] Assignee: Lynn S. Billeter, Salt Lake City, Utah

[21] Appl. No.: 481,905

[22] Filed: Feb. 16, 1990

[51] Int. Cl.⁵ .............................................. F16L 3/00
[52] U.S. Cl. ........................................ 248/57; 248/71
[58] Field of Search ................. 248/546, 57, 65, 71, 248/216.1, 217.2, 300, 906, 342, 343; 52/407, 406, 404, 715, 696, 712

[56] References Cited

U.S. PATENT DOCUMENTS

| | | | |
|---|---|---|---|
| 939,005 | 11/1909 | Goedeke | 248/300 |
| 2,269,211 | 1/1942 | Kuykendall | 248/906 |
| 2,342,965 | 2/1944 | Palmer | 248/906 |
| 2,380,155 | 7/1945 | Divine | 248/906 |
| 2,628,799 | 2/1953 | Aaby | 248/57 |
| 3,162,413 | 12/1964 | Hexdall | 248/217.2 |
| 3,163,386 | 12/1964 | Collins | 248/217.2 |
| 3,285,553 | 11/1966 | Hexdall | 248/71 |
| 3,718,307 | 2/1973 | Albanese | 248/57 |

Primary Examiner—Ramon O. Ramirez
Assistant Examiner—Robert A. Olson
Attorney, Agent, or Firm—M. Reid Russell

[57] ABSTRACT

The present invention is in a pipe hanger for supporting a pipe or duct between ceiling or floor joists. The pipe hanger includes a top thin, narrow, rectangular plate for supporting the pipe or duct thereon with the plate opposite ends for cutting into the grain of opposing joist faces, the hanger to be pivoted therebetween to where the hanger is erected at approximately a right or normal angle between which joist faces. In which mounting, ends of a right angle leg to which plate engage the opposing joist surfaces.

3 Claims, 2 Drawing Sheets

PIPE HANGER

BACKGROUND OF THE INVENTION

1. Field of the Invention

The present invention relates to devices for supporting pipes, ducts and the like, as are located between floor joists.

2. Prior Art

In new construction or home remodeling the installing of pipes, ducts, and the like, between ceiling and floor joists often requires two workers. One worker supports the pipe or duct between such joists while the other attaches, as by nailing strapping between the joist sides, with the pipe or duct resting upon. Even where supports have been fabricated as rigid members for arrangement between joists, such have required nailing, or otherwise attaching the member ends to opposing joist surface, the support spanning therebetween. Installing such support generally requires the efforts of two people, one supporting the pipe or duct while the other connects the support ends to the opposing joist surfaces.

Unlike such earlier arrangements the present invention involves a hanger that can be installed by one person only. Mounting of the hanger ends of the present invention into the opposing joist surfaces does not require fasteners.

SUMMARY OF THE INVENTION

It is a principal object of the present invention in a pipe hanger to provide a hanger wherewith a single worker can mount a pipe or duct between ceiling or floor joists.

Another object of the present invention is to provide a pipe hanger that is for permanent installation between joists that does not require fasteners.

Another object of the present invention is to provide a pipe hanger that can be mounted between joists by an operator utilizing a conventional hammer only.

Still another object of the present invention is to provide a pipe hanger that is individually easily and inexpensively manufactured by conventional cutting and bending of sections of sheet metal, and will support even heavy pipes.

The present invention is in a pipe hanger for supporting pipes, ducts, or the like, between ceiling or floor joists. The pipe hanger is preferably formed from a section of a semi-rigid material, such as sheet steel or tin, that is of a greater length than the spacing distance between joists, which distance is usually between fourteen (14) and eighteen (18) inches, approximately. In the manufacture, the opposite ends of which section of material are notched so as to leave a section that is approximately the spacing distance between joists. This remainder section is bent at a ninety (90) degree, or at a right angle to the section, and is then bent back upon itself, the edge thereof engaging the surface of the section of material. The pipe hanger is thereby formed to have a thin, flat upper plate that has a length that is greater than a spacing distance between opposing joist faces, with the remainder section extending at a right angle and is centered across an edge of the flat plate. So arranged, the remainder section is a right angle leg that has a length to fit closely between joist faces and is in supporting arrangement to a load placed on the flat plate, the combination functioning as a beam. So arranged, a load from a pipe or duct resting thereon, is translated through the pipe hanger ends into the joist faces.

In practice, to mount the pipe hanger between joists, an operator holds the pipe hanger in one hand with the leg pointed downwardly and with the flat plate on a bias between the opposing faces of a pair of joists. So positioned, the operator pushes the pipe hanger against a pipe or duct, lifting it between which joists to where that pipe or duct is appropriately recessed. Whereat, with a hammer, the operator oppositely strikes the pipe hanger ends, the ends biting into the joists. By this force application the pipe hanger is turned into the joints to where the pipe hanger is at approximately a right angle to each of the joist faces. So arranged, the pipe hanger ends will have cut into the grain of the opposite joist faces, with the downward pointing leg ends approximately engaging the joist faces. Removal of which pipe hanger requires only that the hanger ends be hammered oppositely to where the pipe hanger is again turned to a bias to the joist faces allowing it and the pipe or duct supported thereon to be lowered out from between the joists.

BRIEF DESCRIPTION OF THE DRAWINGS

These and other objects and features of the present invention will become more apparent from the following description in which the invention is described in detail in conjunction with the accompanying drawings.

DETAILED DESCRIPTION

Figure 1:
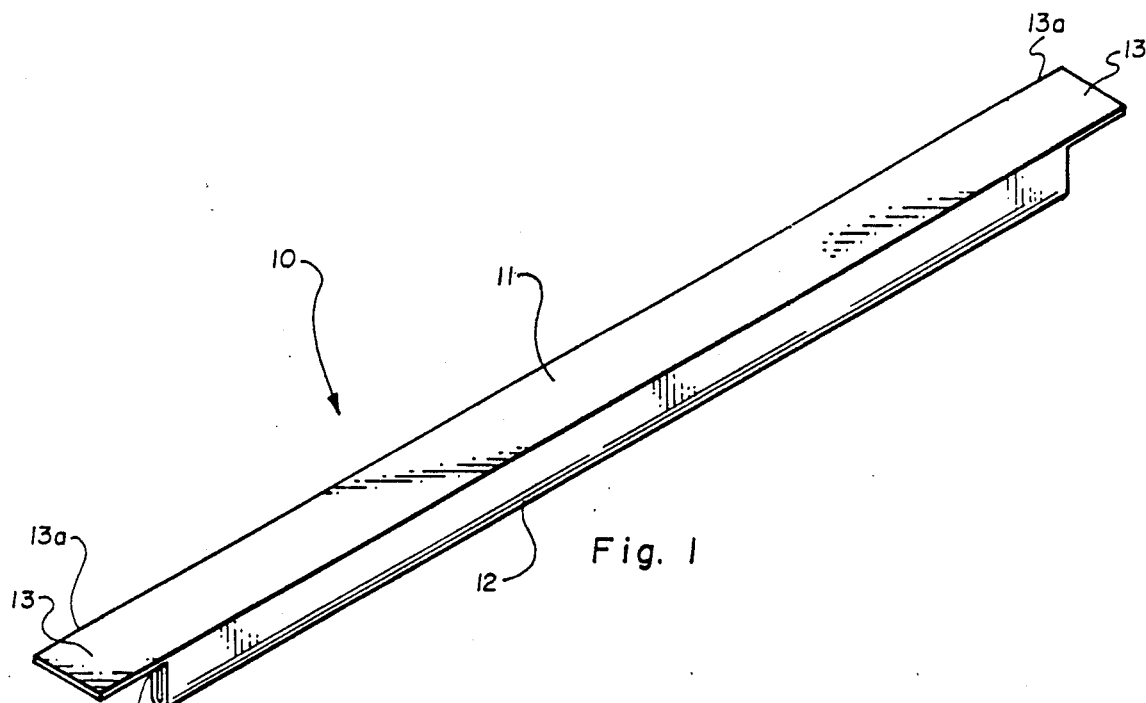
FIG. 1 is a side elevation perspective view of the present invention in a pipe hanger.

FIG. 1 shows a preferred embodiment of a pipe hanger 10 of the present invention, hereinafter referred to as hanger. Hanger 10 consists of a flat, narrow top plate 11, hereinafter referred to as plate, with a leg 12 extending at a right or normal angle from an edge thereof, appearing in profile as an inverted "L". Which leg 12, on each end is shown set back a distance from the plate 11 ends. The plate ends from the leg ends are identified as mounting tabs 13, whose function will be set out hereinbelow with respect to a discussion of FIG. 3 and 4.

Figure 4:
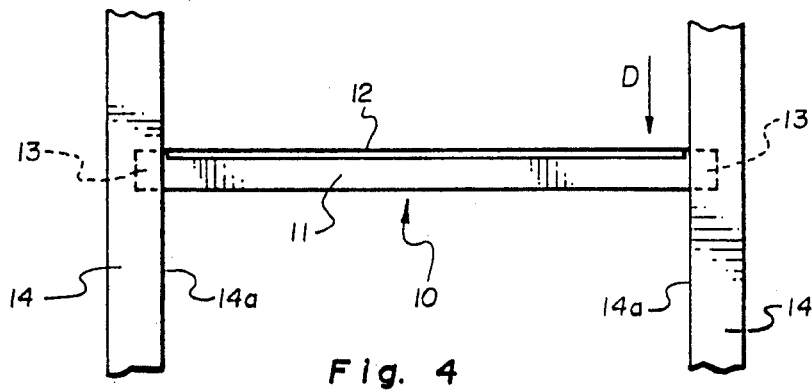
FIG. 4 shows the joist and pipe hanger of FIG. 3, after the pipe hanger opposite or other end has had a force applied thereto, shown as arrow D, showing the pipe hanger as having moved to span, at approximately right angles, between which joist faces.
Figure 5:
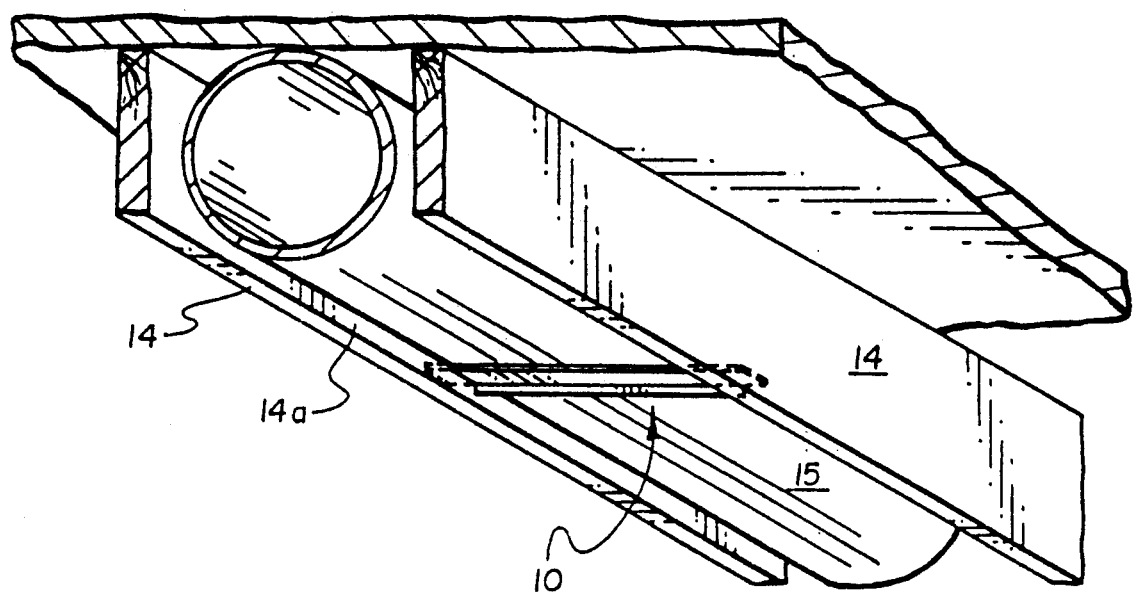
FIG. 5 shows a floor joist with a pipe hanger of FIG. 1, mounted therebetween supporting a pipe or duct.
Figure 2:
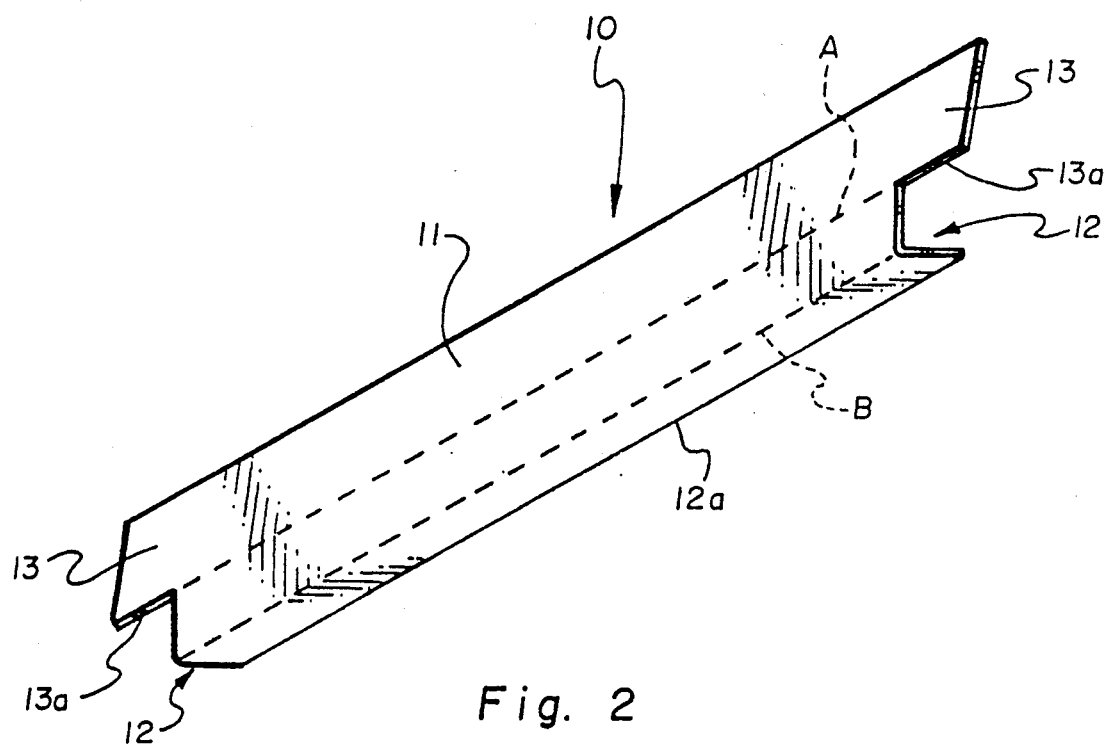
FIG. 2 is a view of a thin rectangular section of material shown notched at its ends, with a side portion, as shown in broken lines, bent upon itself to form the pipe hanger of FIG. 1.

FIG. 2 shows the hanger 10 as preferably formed from a thin, narrow, rectangular section of material, such as a sheet steel or tin, that has had its ends notched, leaving the mounting tabs 13 as remaining or remainder portions. The portion of material adjacent to the removed areas is first bent longitudinally at approximately a right or normal angle along broken line A. Broken line A, as shown, is a straight line between the aligned notch edges 13a of the mounting tabs 13. To complete leg 12, after that first bending, the portion of material is bent so as to double back upon itself along a center broken line 13, shown at B. The edge 12a thereof is to contact the undersurface of plate 11, completing the fabrication of hanger 10. The leg 12 of which hanger 10 is formed to have a length to just fit between adjacent joist faces, as illustrated in FIGS. 4 and 5. Which joist spacing is selected by a builder for a particular load support but is generally from fourteen (14) to eighteen (18) inches.

Figure 3:
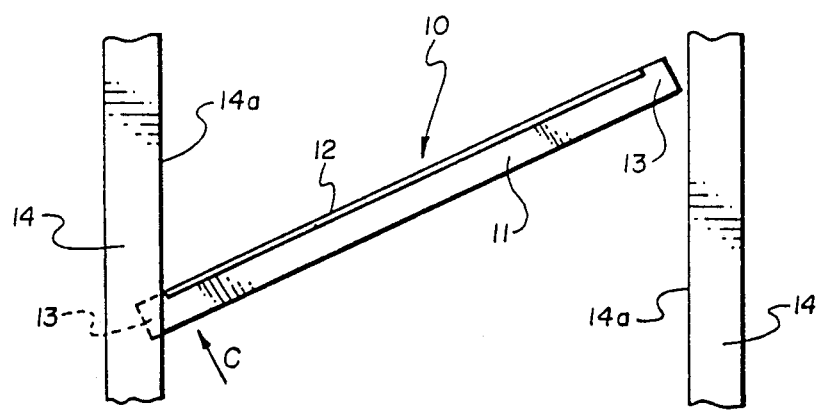
FIG. 3 is a bottom plan view looking upwardly between a pair of joists with the pipe hanger of FIG. 1 fitted therebetween, and showing, with an arrow C, a force applied to one pipe hanger end, shown in broken lines, driving that end into the joist face.

FIGS. 3 and 4 are included to illustrate mounting of the hanger 10, to support a pipe 15, between joints 14, as shown in FIG. 5. FIG. 3 illustrates a positioning of hanger 10 between opposing faces 14a of joists 14. This figure illustrates, with arrow C, an application of a force, as applied with a hammer, against one hanger end. This force drives the mounting tab 13, shown partially in broken lines, into the joist, along the wood grain. Mounting of the hanger 10 is completed, as illustrated in FIGS. 4, by directing an opposite force, illustrated as arrow D, against the opposite hanger end. The mounting tab 13 on the opposite hanger end is thereby driven along the grain into joist face 14a. The hanger 10 is thereby supported at its opposite mounting tabs 13 ends in the joist faces 14a, and extends between which faces at approximately right or normal angles thereto. So arranged, the hanger 10, as illustrated in FIG. 5, will support even a heavy pipe or duct resting on the hanger top plate 11, the weight therefrom translated through the leg 12 to its ends and into the joist faces.

The hanger 10 is installable by one person who holds the hanger 10 in one hand and supports pipe 15 on the plate 11. With a hammer held in their other hand, the person pounds on the opposite hanger ends, as illustrated in FIGS. 3 and 4, driving the mounting tabs 13 into the joist faces 14a. Of course, a number of hangers 10 can be so installed at spaced intervals for supporting a pipe 15 between joists. The hanger 10 can be easily dismounted by applying a force, as with a hammer to first one hanger end and then applying an opposite force to the other hanger end. This force application will pivot the hanger 10 to where the mounting tabs 13 pass out from the joist faces, freeing the hanger.

Hereinabove has been set out a preferred embodiment of the present invention in a pipe hanger and a description of its use. It should, however, be understood that the present disclosure is made by way of example only and that variations thereto are possible within the scope of this disclosure without departing from the subject matter coming within the scope of the following claims and reasonable equivalency thereof, which claims I regard as my invention.

I claim:

1. A pipe hanger comprising a straight plate having opposite ends that are spaced apart a greater distance than the distance between opposing faces of floor or ceiling joists, which said plate opposite ends are arranged to be driven into and along the grain of said opposing joist faces by an application of oppositely directed forces to said opposite plate ends; a leg secured to the undersurface of said plate that extends at approximately a right or normal angle therefrom and is of a length to closely fit between said joist opposite faces; and the plate and leg are formed from a single flat, rectangular section of a thin gauge material whose opposite ends are notched and the said material is folded longitudinally at approximately a right angle on line with aligned sides of which notches, and said folded portion is then again folded longitudinally upon itself to where said folded portion edge engages the undersurface of said plate, forming said leg.

2. A pipe hanger as recited in claim 1, wherein the plate and plate ends are planar and formed from a thin gauge, narrow, rectangular section of a steel or like material.

3. A pipe hanger as recited in claim 1, wherein the leg extends downwardly at a right angle from the plate undersurface from along one edge of which plate to span between the opposing joist faces.

* * * * *